Dec. 18, 1951 W. W. MINER, JR., ET AL 2,578,822
INCLINED-AXIS HAY-MANGLER WITH ROTOR
HAVING TWISTED DRAFT BLADES
Filed Oct. 8, 1946 4 Sheets-Sheet 1

INVENTORS,
William Wiley Miner, Jr.,
Roland Owens, & Ned Ray,
BY
Albert E. Dieterich,
ATTORNEY.

Dec. 18, 1951 W. W. MINER, JR., ET AL 2,578,822
INCLINED-AXIS HAY-MANGLER WITH ROTOR
HAVING TWISTED DRAFT BLADES
Filed Oct. 8, 1946 4 Sheets-Sheet 2

INVENTORS,
William Wiley Miner, Jr.,
Roland Owens, & Ned Ray,
BY
Albert E. Dieterich,
ATTORNEY.

Dec. 18, 1951 W. W. MINER, JR., ET AL 2,578,822
INCLINED-AXIS HAY-MANGLER WITH ROTOR
HAVING TWISTED DRAFT BLADES
Filed Oct. 8, 1946 4 Sheets-Sheet 3

INVENTOR,
William Wiley Miner, Jr.,
Roland Owens, & Ned Ray.
BY
Albert E. Dieterich
ATTORNEY.

Dec. 18, 1951     W. W. MINER, JR., ET AL     2,578,822
INCLINED-AXIS HAY-MANGLER WITH ROTOR
HAVING TWISTED DRAFT BLADES
Filed Oct. 8, 1946     4 Sheets-Sheet 4
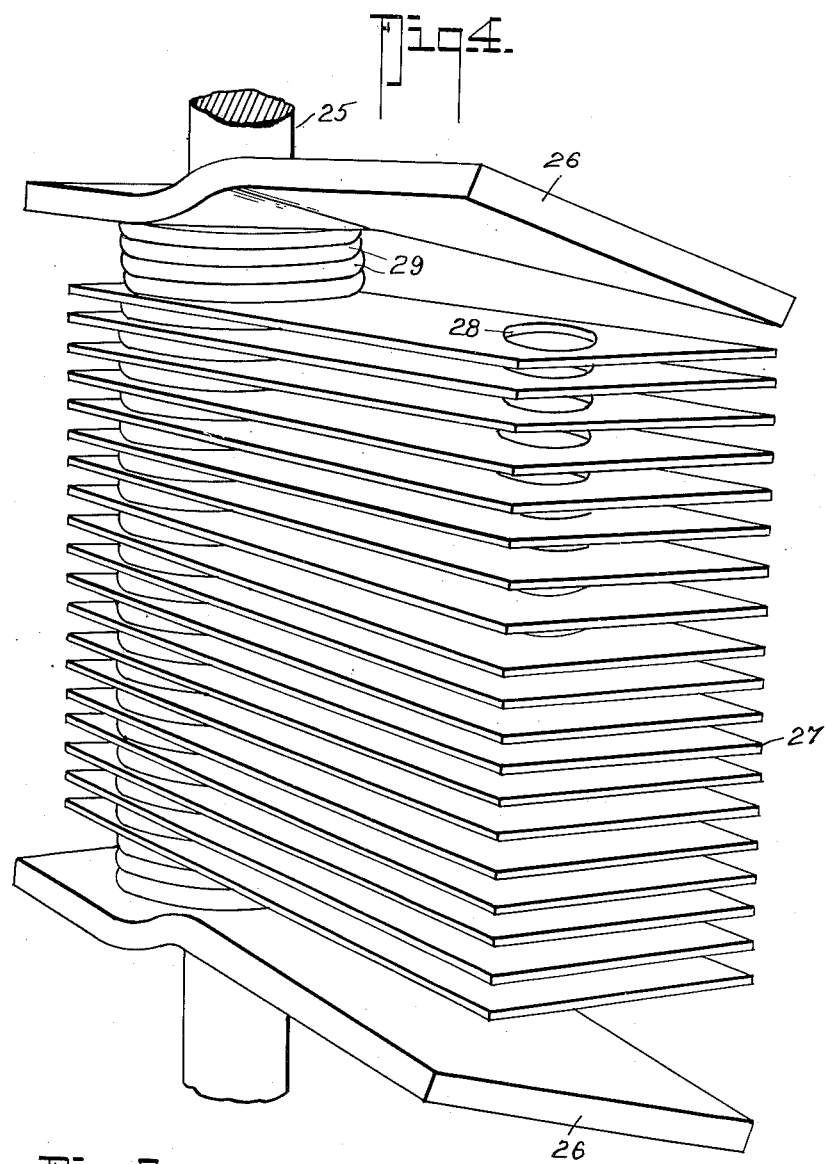
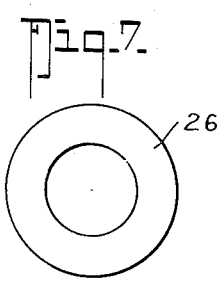
INVENTORS,
William Wiley Miner, Jr.,
Roland Owens, & Ned Ray,
BY Albert E. Dieterich,
ATTORNEY.

Patented Dec. 18, 1951

2,578,822

UNITED STATES PATENT OFFICE 2,578,822

INCLINED-AXIS HAY MANGLER WITH ROTOR HAVING TWISTED DRAFT BLADES

William Wiley Miner, Jr., Ned Ray, and Roland Owens, Verdon, Nebr.

Application October 8, 1946, Serial No. 701,882

2 Claims. (Cl. 241—186)

In the manufacture of alfalfa meal the usual— one might almost say the "universal"—process is this: The alfalfa is cut in field upon farm and immediately put through a field chopper which cuts it into lengths of one to four inches—this to expedite the handling. It is then hauled to the plant. Sometimes it goes through a grinder, usually of the hammermill type—sometimes not. Next it goes through a dehydrator which completely extracts the moisture. Then it receives its final grinding.

The alfalfa plant is composed of two parts, the leaf and the stem. The leaf is the most valuable portion. The leaf portion has the greater feed value, is the choicer part. At the present time, with the present machinery, it is practically impossible to dehydrate the plant adequately and with uniformity. The leaf yields its moisture readily; the stem is much more difficult to dehydrate. If the (chopped) alfalfa remains in the dehydrating chamber long enough to dehydrate the stem completely the leaf part will be scorched or burned. If it remains only long enough to dehydrate the leafy portion the stem part retains too much moisture.

Endeavors have been made, usually unsuccessfully, to make use of the "hammermill" type of grinding for the initial grinding. The alfalfa plant is 60% to 70% moisture. Due to this excess of moisture the grinder gums up, clogs up. Alfalfa being processed is thrown back into the hopper which feeds the grinder. Perhaps the proper word is it "regurgitates." The grinding done by the present conventional type of grinder is almost wholly inadequate for the initial grinding, the grinding done before the alfalfa enters the dehydrating chamber.

In the present conventional type of grinder the product to be ground is introduced into the grinder perpendicularly to the shaft upon which the grinding hammer rotates. Herein lies the difficulty in grinding and the defect of the known grinding process.

The present invention, therefore, has for its object to overcome the objectionable features above referred to.

Other objects will in part be obvious and in part be pointed out hereinafter.

To the attainment of the aforesaid objects and ends the invention further resides in the novel details of construction, combinations and arrangement of parts, all of which will first be described and then be specifically pointed out in the appended claims, reference being had to the accompanying drawings in which:

Fig. 4 is a perspective view on an enlarged scale of one of the combined grinding hammer and draft blade units.

Fig. 7 is a plan view of one of the spacer rings.

Figure 1:
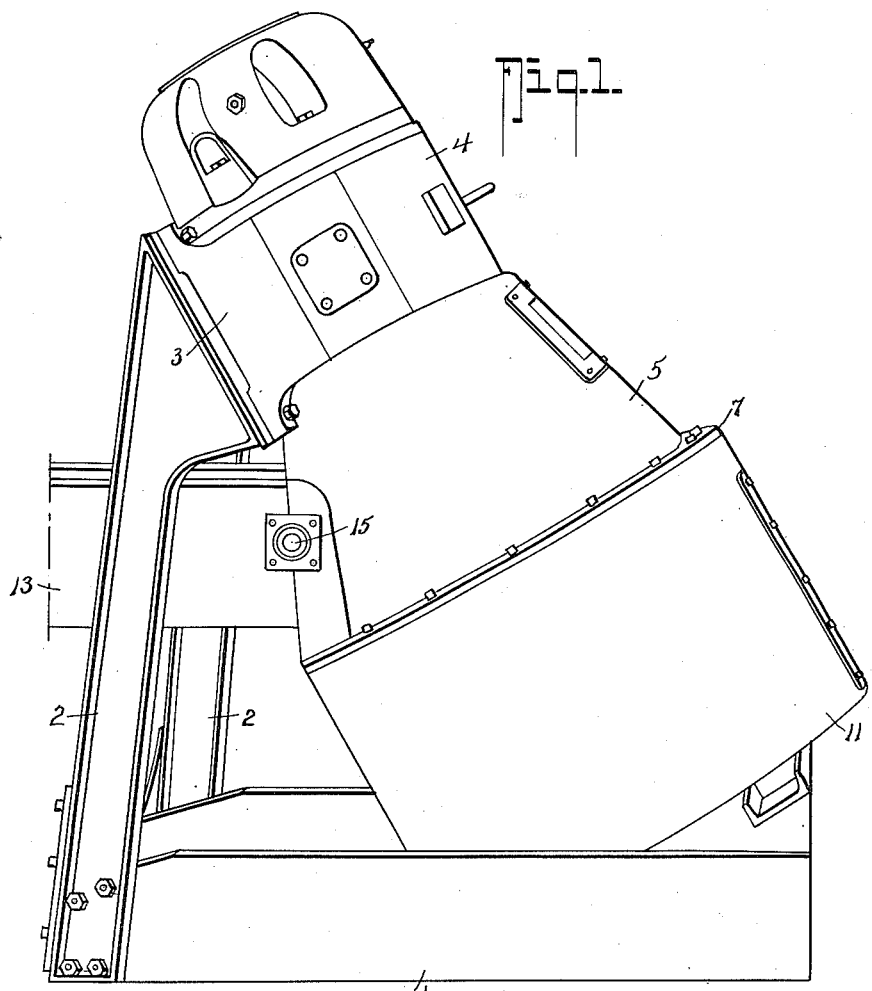
Fig. 1 is a perspective view of the machine embodying our invention.
Figure 5:
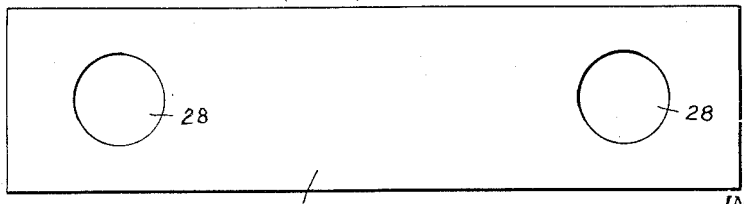
Fig. 5 is a plan view of one of the grinding-hammer blades.
Figures 2, 6:
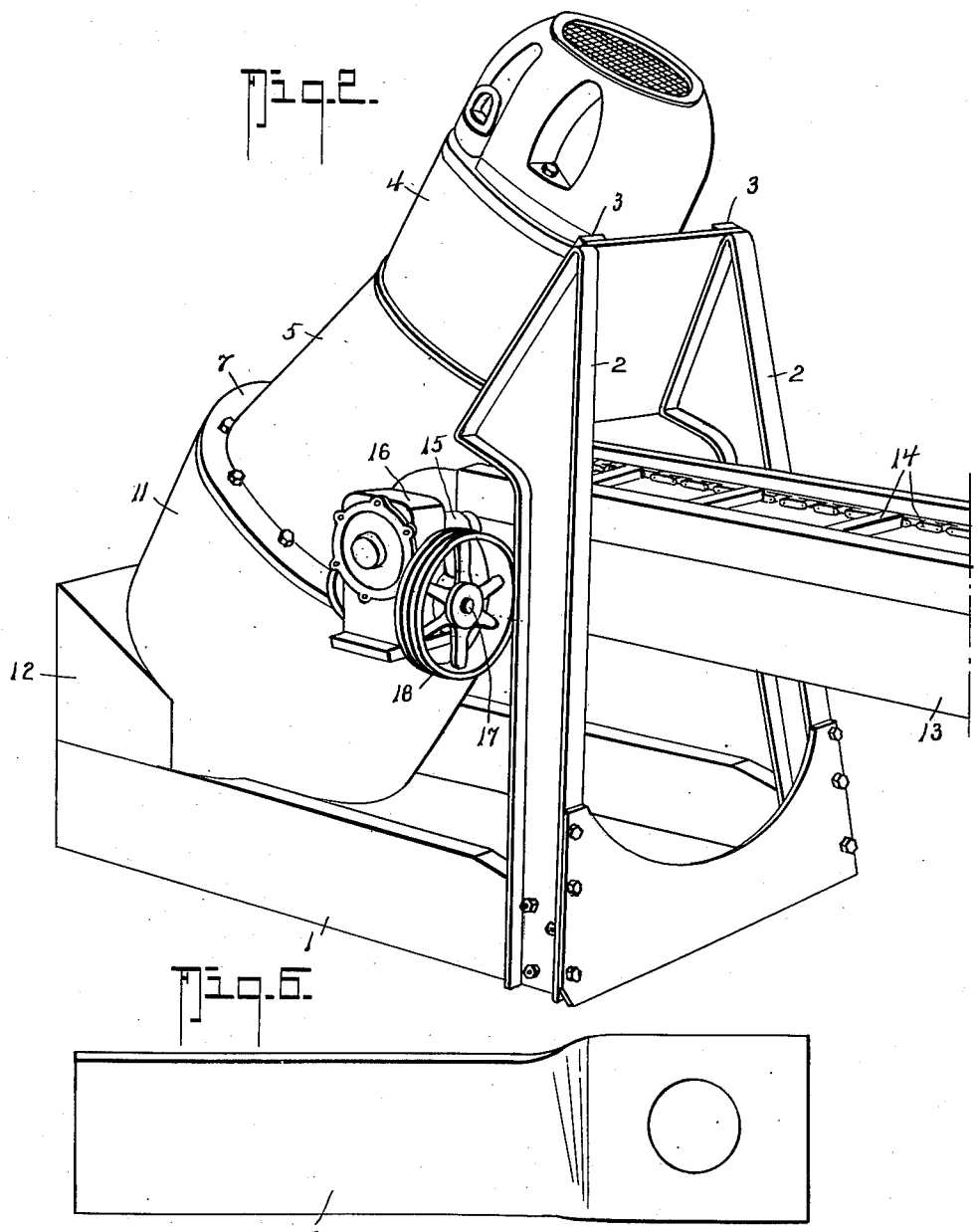
Fig. 2 is a perspective view of the same looking at another side of the machine.
Fig. 6 is a plan view of one of the draft blades.
Figure 3:
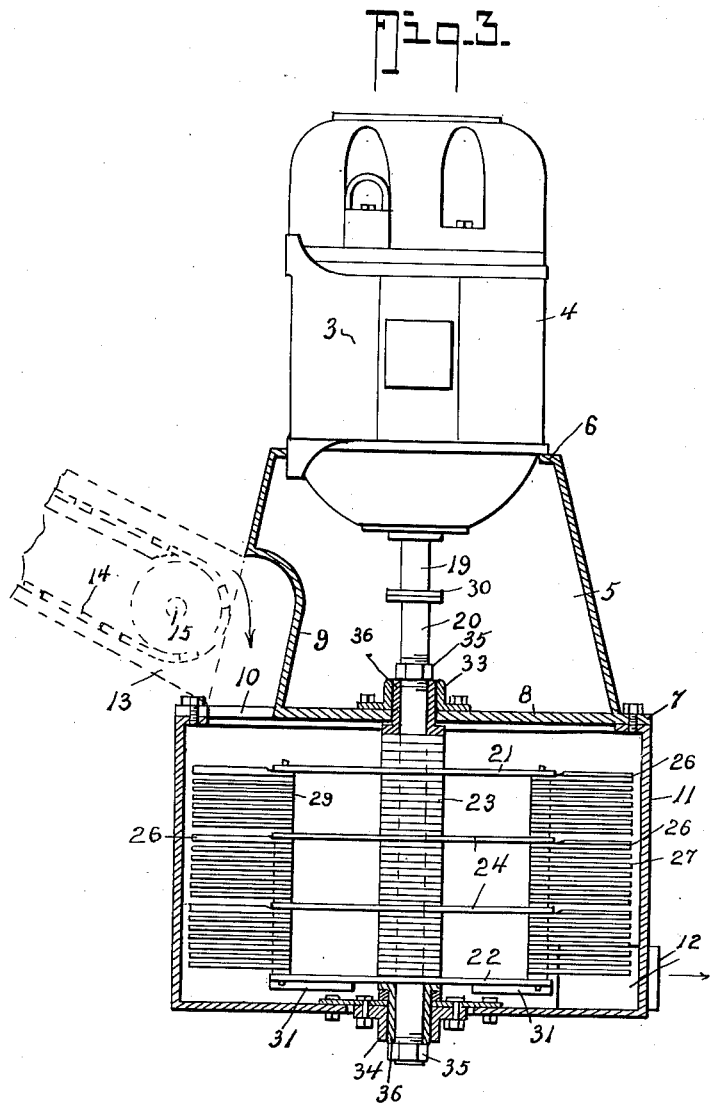
Fig. 3 is a part vertical section and part elevation of the mangler unit.

In the drawings in which like numerals of reference indicate like parts in all the figures, 1 represents a suitable base on which and on standards 2, the mangler is supported. An electric motor within a housing 4 is mounted via brackets 3 on the standards 2 and rests on the upper flange 6 of a truncated conical housing 5.

The housing 5 has a lower flange 7 which is bolted, or otherwise suitably fastened to the upper end of a mangler casing 11. The housing 5 has a bottom 8 with an opening 10 and it also has an indented wall 9 which, together with the opening 10, constitutes an inlet throat.

The casing 11 has a discharge outlet 12.

A suitable conveyor delivers the material to be treated (alfalfa for example) to the throat so that it will enter the casing 11 in a direction approximately parallel to the impeller shaft 20 of the mangler. The conveyor preferably employed includes a runway or support 13 and an endless slatted conveyor proper 14 the drive shaft 15 of which connects to the speed changing mechanism 16 (of any well known construction) and is driven through the medium of a belt-driven pulley 18 on a shaft 17 to the gear box.

The shaft 19 of the electric motor is suitably coupled (as at 30) to the main shaft 20 of the rotor. The shaft 20 passes through a suitable bearing 33 carried by the plate 8 and, within the casing 11, carries upper and lower discs 21 to 22 respectively. These discs are made fast to the shaft 20 in any suitable way and between the discs 21 and 22 extend auxiliary shafts 25 on which draft blades 26 and hammer blades 27 are freely mounted adjacent one end of each blade, the blades being spaced apart by spacing rings 29 on the shafts 25.

Each blade 27 adjacent its ends is provided with a hole 28 for the shaft 25, the blades being reversible.

The blades 26—27 may be mounted in separate groups by the interposition of intermediate plates 24 having apertures for the passage of shafts 20 and 25 and being spaced apart on shaft 20 by spacing rings 23. The blades 26 and 27 are separated by rings 29 best shown in Fig. 4.

33 and 34 designate the bearings for the shaft 20. The plates 21, 24 and 22, and spacing rings 23 are held together under pressure by means of nuts 35, operating through sleeve 36. Blades 26 and 27 and spacing rings 29 are free to swing on shaft 25. 31 designates sweep blades secured to the bottom disk for the purpose of keeping the material from packing under disc 22.

The material is fed into the casing 11 as before intimated where it is cut up by the blades 27 and gradually forced downwardly and outwardly upon rotation of the rotor.

From the foregoing description taken in connection with the accompanying drawings it is thought that the construction, operation and advantages of our invention will be clear to those skilled in the art.

What is claimed is:

1. In apparatus of the class described, a support; a mangler mounted on said support with its axis inclined to the vertical, said mangler including an imperforate casing having an imperforate peripheral wall, a closed bottom and an open top and having an outlet in said peripheral wall adjacent said bottom; a driven shaft on which is mounted grinding hammer blades which blades are located within said casing; a housing mounted on top of said casing and having a bottomplate which serves as a top for said casing; bearings on said top and on said closed bottom for said shaft; said housing having an indentation in its side serving as a throat to receive the material to be treated and having an opening in said top adjacent the peripheral wall of said casing and registering with said throat to pass material into said casing adjacent the peripheral wall of the same; and a drive motor resting on said housing and coupled to said shaft.

2. In apparatus of the class described, a support, a mangler mounted on said support, said mangler including an imperforate casing having a closed bottom and a peripheral wall with a discharge outlet in said peripheral wall adjacent said bottom, a rotor journaled in said casing, said rotor including a shaft, a set of spaced-apart discs secured on said shaft, sets of flat hammer blades pivotally mounted on hammer-mounting shafts carried by said discs, and at least one twisted draft-producing blade for each set of flat blades and pivoted on said hammer-mounting shafts; means for passing the material to be treated into said casing at the top of the same adjacent said peripheral wall, means to rotate the aforesaid first mentioned shaft, the axes of said casing and said shafts being inclined to the vertical and said means for passing material being located at the lower part of the top of said casing.

WILLIAM WILEY MINER, Jr.
NED RAY.
ROLAND OWENS.

REFERENCES CITED

The following references are of record in the file of this patent:

UNITED STATES PATENTS

| Number | Name | Date |
| --- | --- | --- |
| 291,191 | Ittner | Jan. 1, 1884 |
| 677,702 | Russell | July 2, 1901 |
| 907,275 | Nolte | Dec. 22, 1908 |
| 937,411 | Block | Oct. 19, 1909 |
| 1,048,869 | Pitcairn | Dec. 31, 1912 |
| 1,591,560 | Prater | July 6, 1926 |
| 1,713,957 | Duvall | May 21, 1929 |
| 1,748,050 | Harrington | Feb. 18, 1930 |
| 1,755,576 | Eppenbach | Apr. 22, 1930 |
| 2,082,419 | Rietz | June 1, 1937 |
| 2,233,728 | Bell | Mar. 4, 1941 |
| 2,267,729 | Grindle | Dec. 30, 1941 |
| 2,325,426 | Rietz | July 27, 1943 |
| 2,416,432 | Brady | June 9, 1945 |